(12) United States Patent
West

(10) Patent No.: US 6,577,495 B2
(45) Date of Patent: Jun. 10, 2003

(54) FUSE BASE ASSEMBLY

(75) Inventor: Rodney J West, Liberty, IN (US)

(73) Assignee: Square D Company, Palatine, IL (US)

( * ) Notice: Subject to any disclaimer, the term of this patent is extended or adjusted under 35 U.S.C. 154(b) by 52 days.

(21) Appl. No.: 09/738,443

(22) Filed: Dec. 15, 2000

(65) Prior Publication Data

US 2002/0075635 A1 Jun. 20, 2002

(51) Int. Cl.[7] .................. H01H 85/02; H02B 1/26
(52) U.S. Cl. ................... 361/626; 361/837; 337/194; 337/195
(58) Field of Search ................. 361/822–826, 361/837, 626; 337/4, 186, 194, 195; 439/621, 622

(56) References Cited

U.S. PATENT DOCUMENTS

| 3,744,003 | A | * | 7/1973 | Dipace | 337/209 |
| 4,052,688 | A | * | 10/1977 | DeNigris et al. | 337/187 |
| 4,432,594 | A | * | 2/1984 | Daggett | 439/698 |
| 4,661,807 | A | * | 4/1987 | Panaro | 337/206 |
| 4,950,195 | A | * | 8/1990 | Perreault et al. | 439/621 |
| 5,167,541 | A | * | 12/1992 | Alves et al. | 337/186 |
| 5,631,619 | A | * | 5/1997 | Evans | 337/166 |
| 6,326,878 | B1 | * | 12/2001 | Liang | 337/214 |

\* cited by examiner

Primary Examiner—Jayprakash N. Gandhi
(74) Attorney, Agent, or Firm—David R. Stacey; Larry T. Shrout; Larry I. Golden

(57) ABSTRACT

A fuse base assembly for electrical fuses, including an electrical bus on which a load end fuse clip of the end-user's choice can be attached. The electrical bus is provided with means for attaching the selected load end fuse clip in a linearly adjustable manner such that the end user can adjust the spacing between the line and load end fuse clips as required for the desired fuse. The electrical bus is also provided with a load terminal attaching point such that wiring between the load device and the fuse is easily accomplished.

18 Claims, 4 Drawing Sheets

FUSE BASE ASSEMBLY

FIELD OF THE INVENTION

The present invention relates to the field of electrical fuses, and particularly to fuse base assemblies.

SUMMARY OF THE INVENTION

The present invention provides a fuse base assembly that allows an end user to select the type of fuse he wishes to use without ordering an electrical device manufactured specifically for the desired fuse. The fuse base accepts fuse clips for the desired fuse type and current rating. The fuse clips are easily installed on the fuse base assembly with common hand tools. The fuse base assembly can be an integral part of an electrical enclosure or a separate base assembly for retrofitting existing electrical enclosures. The fuse base assembly includes a base and one electrical bus and slidably captivated screw for each fuse position. The screw is slidably captivated between the base and electrical bus. A fuse clip kit includes fuse clips of the type appropriate for the selected fuse, wire binding terminals properly sized for the load wire and the necessary connecting hardware. One fuse clip is attached to each line terminal and one fuse clip is attached to each electrical bus by means of its slidably captivated screw and a nut. The proper dimension between the line and load fuse clips is obtained by sliding the load fuse clip along the electrical bus to the proper location and tightening the nut. A wire binding terminal of appropriate size is attached to the electrical bus by hardware provided in the fuse clip kit.

Figure 1:
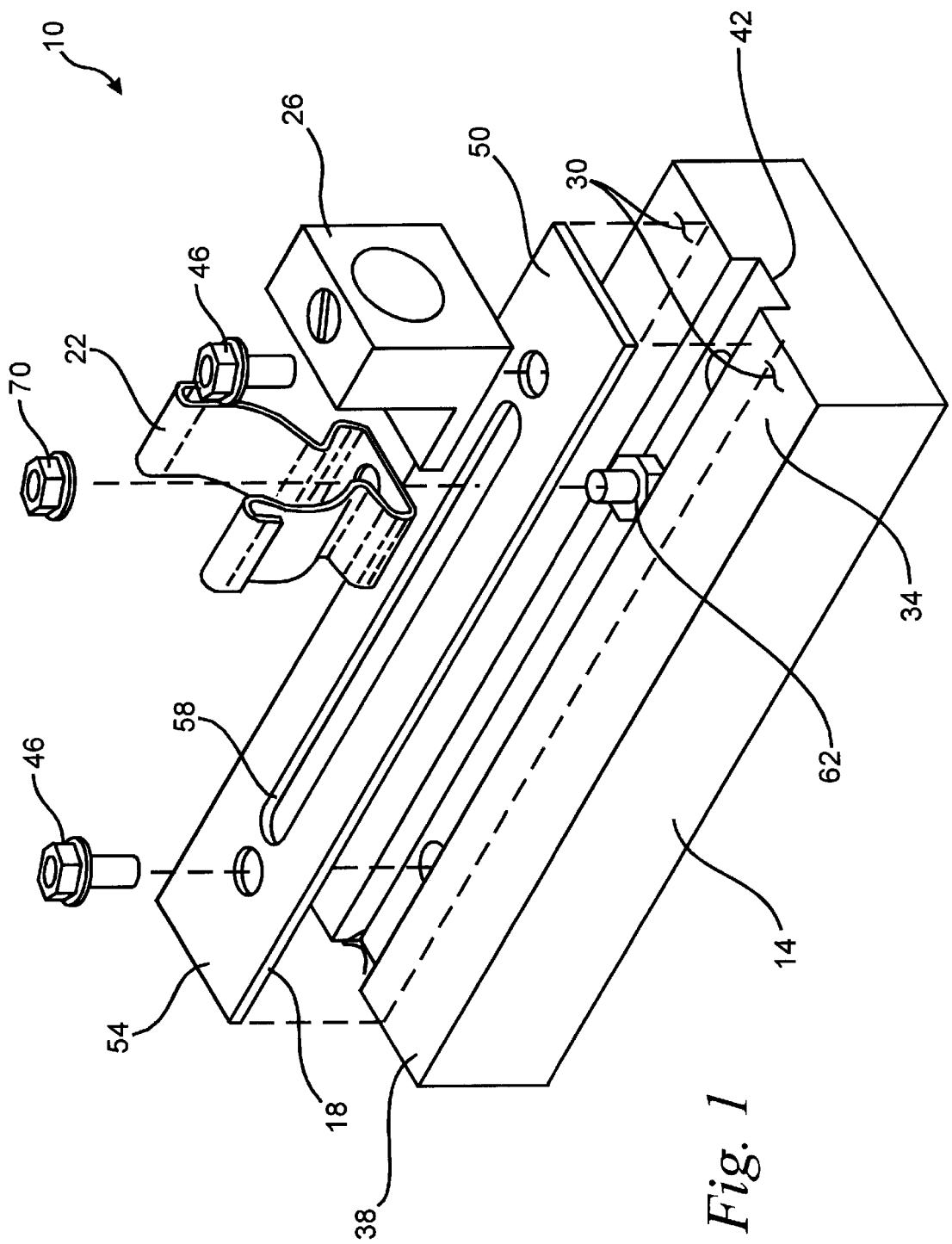
FIG. 1 is an exploded view of a fuse base assembly constructed in accordance with the present invention.

Before one embodiment of the invention is explained in detail, it is to be understood that the invention is not limited in its application to the details of construction described herein or as illustrated in the drawings. The invention is capable of other embodiments and of being practiced or being carried out in various other ways. Further, it is to be understood that the phraseology and terminology used herein is for the purpose of description and should not be regarded as limiting.

DETAILED DESCRIPTION OF THE DRAWINGS

FIG. 1 illustrates a fuse base assembly in exploded view, generally indicated by reference numeral 10, constructed in accordance with the present invention. The fuse base assembly 10 includes a base 14, an electrical bus 18 attached to the base 14, a fuse clip 22 and a wiring terminal 26. The base 14 has a generally flat surface 30, is elongated in shape, and can be easily manufactured by molding, extruding, milling or any combination thereof. The base 14 has a first end region 34, a second end region 38 and is provided with a longitudinal slot 42 extending generally between the first and second end regions, 34 and 38, respectively, in the flat surface 30. The electrical bus 18 is positioned generally over or in the slot 42. The electrical bus 18 can be attached to the base 14 by conventional fasteners such as screws 46, integrally formed locking means or a slidable friction fit within the longitudinal slot 42. The electrical bus 18 is generally flat and elongated in shape and has a first end portion 50, a second end portion 54 and a slot 58 extending generally between the first and second end portions, 50 and 54 respectively. The wiring terminal 26 is attached at the first end portion 50 of the electrical bus 18. The fuse clip 22 can be selectively attached at any point along the slot 58, thereby permitting the distance between the fuse clip 22 and a line end fuse clip (not shown) to be linearly adjustable within a range generally defined by the length of slot 58. The fuse clip 22 is attached to the electrical bus 18 by a threaded fastener 62 and nut 70. It is within the scope of the invention that a clamping device capable of providing the clamping force required for a good electrical connection between the electrical bus 18 and the fuse clip 22 could also be used.

Figure 2:
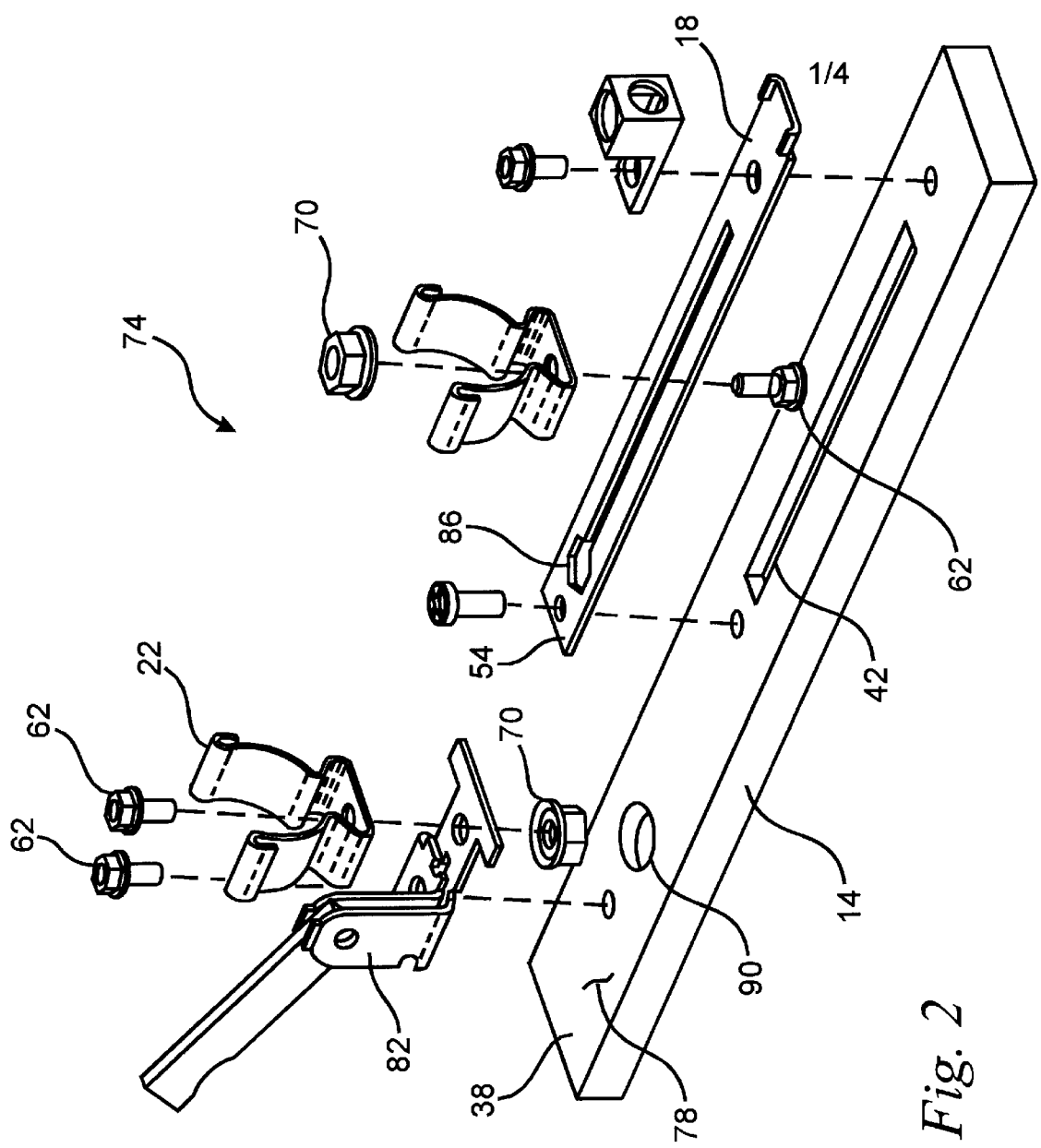
FIG. 2 illustrates a fuse base assembly of FIG. 1 including a fixed line end fuse clip mounting position.

FIG. 2 illustrates a fuse base assembly 74 having all of the features of fuse base assembly 10 and a fixed mounting position 78 located at the first end region 38 of the base 14. The fixed mounting position 78 is provided for mounting a line end fuse clip 22 and an associated switch blade assembly 82. A wire and wiring terminal or an electrical bus connector (not shown) can be used to electrically connect the line end fuse clip 22 to the associated switch blade assembly 82. In the embodiment shown, the slot 42 in the base 14 is provided only under the electrical bus 18. The bus 18 includes an aperture 86 located at the second end portion 54 of its slot 58. The aperture 86 is dimensioned for receiving the head of the fastener 62 or the nut 70 while the slot 58 is dimensioned to captivate the head of the fastener 62 or nut 70. The line end fuse clip 22 is attached to the switch blade assembly 82 by a threaded fastener 62 and nut 70 and the switch blade assembly 82 is attached to the base 14 by a threaded fastener 62. An aperture 90 defined in the base 14 can be configured to receive the head of the threaded fastener 62 or nut 70 such as to prevent rotation as the fuse clip 22 is installed, or it can be dimensioned for clearance. Either of the fuse base assemblies 10 or 74 can be factory installed in new fused switches or field installed to retrofit existing fused switches. Retrofitting is accomplished by replacing the old load end fuse base assemblies with the fuse base assembly 10 or 74 of the present invention. In factory installed applications, the end user would indicate the desired type of fuse clips to be installed or order a fuse clip kit containing fuse clips and assembly hardware for the desired fuse type and rating. In retrofit applications the fuse base assembly 10 or 74 can use the original line and load end fuse clips or a fuse clip kit containing fuse clips and hardware for the desired fuse type rating can be installed. The base assemblies 10 and 74 can also be configured for multiple fuse installation by adding additional slots 42 and electrical buses 18 as required.

Figure 3:
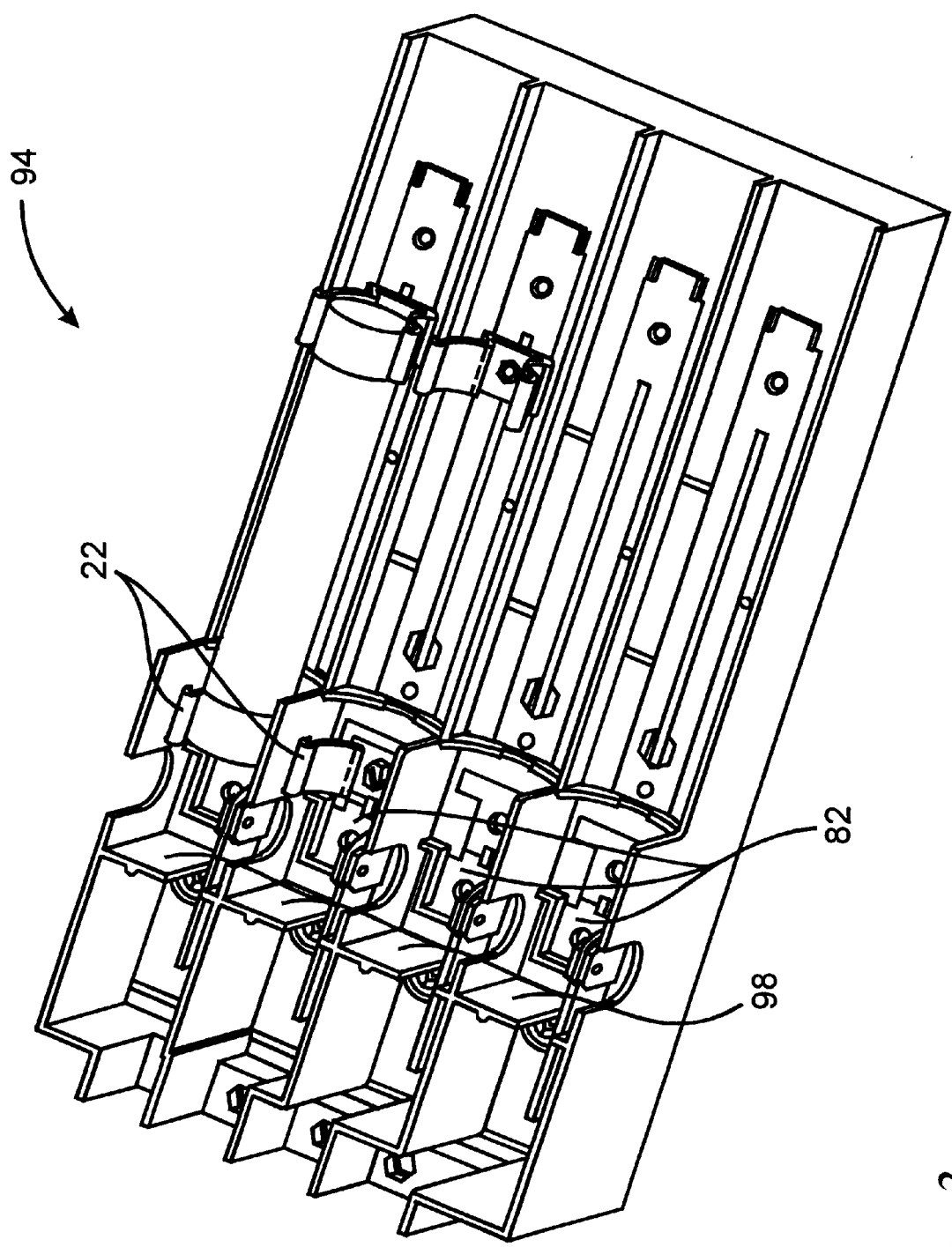
FIG. 3 illustrates a fused switch base assembly including a linearly variable load end electrical bus in accordance with the present invention.

FIG. 3 illustrates an integrated switch base assembly 94 that includes all of the features of fuse base assembly 74 (FIG. 2) and further includes integrally formed chambers 98 for electrically separating the line end fuse clips 22 and switch blade assemblies 82 of adjacent electrical phases. The switch base assembly 94 can be installed in an existing enclosure as a retrofit or can be used in new switch construction as a subassembly.

Figure 4:
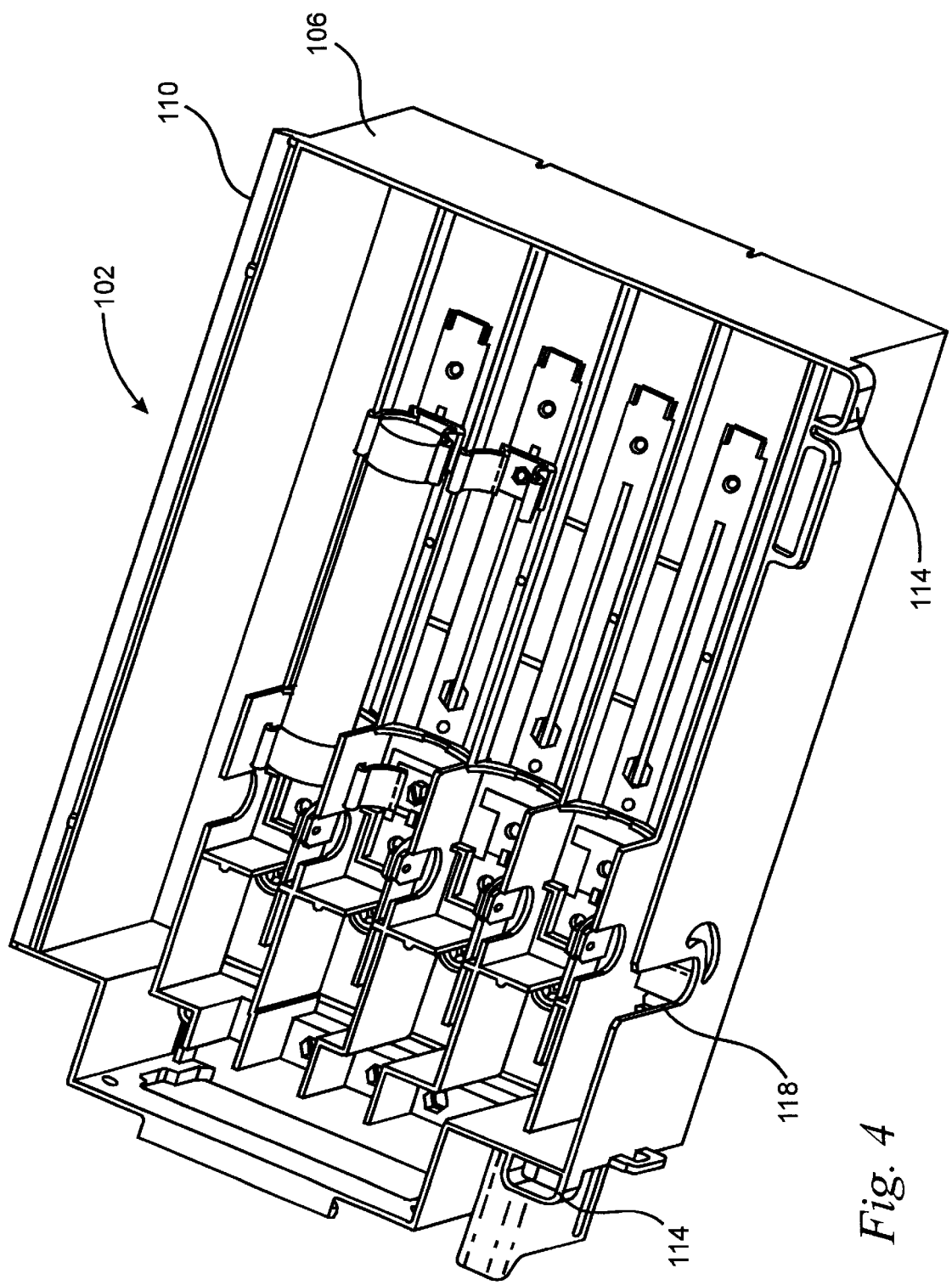
FIG. 4 illustrates an electrical enclosure including an integral fuse base assembly constructed in accordance with the present invention.

FIG. 4 illustrates an integral fuse switch assembly 102 that includes the switch base assembly 94 of FIG. 3 and an integral enclosure 106. Although a cover is not shown, the enclosure 106 can include integrally formed hinge means along one edge of the enclosure 106. The hinge means can include hinge pins or hinge pin sockets, an extending rib 110 about which a cover rotates or a living hinged cover. Provisions for latching a cover in the closed position such as loops 114 can be integrally formed in the enclosure 106. Openings 118 can be provided for the passage of exterior operator mechanisms.

It is within the scope of this invention that any of the fuse base assemblies 10 and 74, integrated switch base assembly 94 or switch assembly 98 can be constructed in current ranges wherein the maximum current rating is determined by the maximum current rating of the electrical bus 18. It is also within the scope of this invention that the fuse clips 22 can be for any one of the many domestic or international fuse types that an end user might desire to employ.

I claim:

1. A fuse base assembly comprising:
   a base having a linear dimension; and
   at least one electrical bus having a linear dimension, said at least one electrical bus being attached to said base and said at least one electrical bus being adapted for attaching a fuse clip in a linearly adjustable manner.

2. The fuse base assembly of claim 1, wherein said base defines at least one linearly extending groove and said at least one electrical bus defines a linearly extending slot.

3. The fuse base assembly of claim 2, wherein said least one electrical bus is attached to said base such that said slot overlaps said groove thereby slidably captivating a screw for attaching the fuse clip.

4. The fuse base assembly of claim 1, wherein said base further defines at least one fixed fuse clip mounting position associated with said at least one electrical bus.

5. The fuse base assembly of claim 4, wherein said base further defines at least one chamber generally surrounding said at least one fixed fuse clip mounting position.

6. The fuse base assembly of claim 5, wherein said base is an integrally molded part of a fused switch assembly including an integrally molded enclosure generally surrounding said base.

7. A fuse base assembly comprising:
   a fuse base defining at least one linearly extending groove; and
   at least one electrical bus attached to said fuse base such as to be associated with said at least one linearly extending groove, said electrical bus being adapted for attaching a fuse clip in a linearly adjustable manner.

8. The fuse base assembly of claim 7, wherein said at least one electrical bus defines a slot.

9. The fuse base assembly of claim 8, wherein said at least one electrical bus is positioned over said linearly extending groove such that said slot generally corresponds with said at least one linearly extending groove.

10. The fuse base assembly of claim 9, wherein said slidably captivates a fastening device such that the fuse clip can be attached to said at least one electrical bus at some selected position along said slot.

11. The fuse base assembly of claim 10, wherein said fastening device can be a threaded fastener.

12. A fuse base assembly for receiving a user selectable fuse, said fuse base assembly comprising:
    a fuse base defining at least one fixed fuse clip attaching position and at least one linearly variable fuse clip attaching position associated with said at least on fixed fuse clip attaching position such that a particular selected linear distance can be maintained between said fixed fuse clip attaching position and a particular point along said linearly variable fuse clip attaching position.

13. The fuse base assembly of claim 12 wherein said at least one fixed fuse clip attaching position includes an aperture defined in said fuse base.

14. The fuse base assembly of claim 13 wherein said at least one linearly variable fuse clip attaching position includes a slot defined in said fuse base, said slot being arranged such that a line extending along a longitudinal axis of said slot will pass through the origin of said aperture of said at least one fixed fuse clip attaching position.

15. The fuse base assembly of claim 14 wherein said aperture receives a fastening means for attaching a line end fuse clip to said fuse base assembly.

16. The fuse base assembly of claim 14 wherein each said at least one linearly variable fuse clip attaching position further includes a bus member significantly covering said slot and on which said load end fuse clip is attached.

17. The fuse base assembly of claim 16 wherein said bus member defines a longitudinally extending slot slidably captivating a fastener for attaching said load end fuse clip to said bus member.

18. The fuse base assembly of claim 17 wherein said bus member further defines a receiving aperture at one end of said longitudinally extending slot for receiving a head portion of said fastener.

* * * * *